United States Patent

[11] 3,556,280

[72] Inventors Walter Schnee;
 Peter Maag, Villingen, Germany
[21] Appl. No. 765,147
[22] Filed Oct. 4, 1968
[45] Patented Jan. 19, 1971
[73] Assignee Fr. Winkler KG Spezialfabrik fur
 Backereimaschinen und Backofen
 Villingen, Black Forest, Germany
[32] Priority Mar. 15, 1968
[33] Denmark
[31] 1100/68

[54] APPARATUS FOR DEPOSITING ARTICLES IN ROWS
 12 Claims, 1 Drawing Fig.
[52] U.S. Cl. .................................................. 198/31
[51] Int. Cl. .............................................. B65g 47/26
[50] Field of Search .......................................... 198/30,
 31A2, 139, 20, 31; 53/59, 74, 73

[56] References Cited
UNITED STATES PATENTS
3,357,154 12/1967 Florian ......................... 53/59

Primary Examiner—Richard E. Aegerter
Attorney—Spencer and Kaye

ABSTRACT: Apparatus for depositing articles in rows on a tray, conveyor, or the like. The apparatus employs a conveyor belt which receives the articles at one end of its transport length and drops them from the other. A plurality of guides are provided for guiding the belt; these guides include a stationary guide defining one end of the transport length of the belt and a movable guide defining the other. The movable guide is movable in a linear direction above the receiving tray or conveyor to vary the transport length of the belt. According to the invention, the conveyor belt is advanced a prescribed distance from the stationary to the movable guide by a first drive means each time an article is received by the belt, and the movable guide is moved in the linear direction by a second drive means each time a prescribed number of articles have been received. The second drive means is separate from, but operates in dependence upon the first drive means to move the movable guide in the direction opposite to the direction of movement of the conveyor belt and back again in one swift action.

PATENTED JAN 19 1971
3,556,280
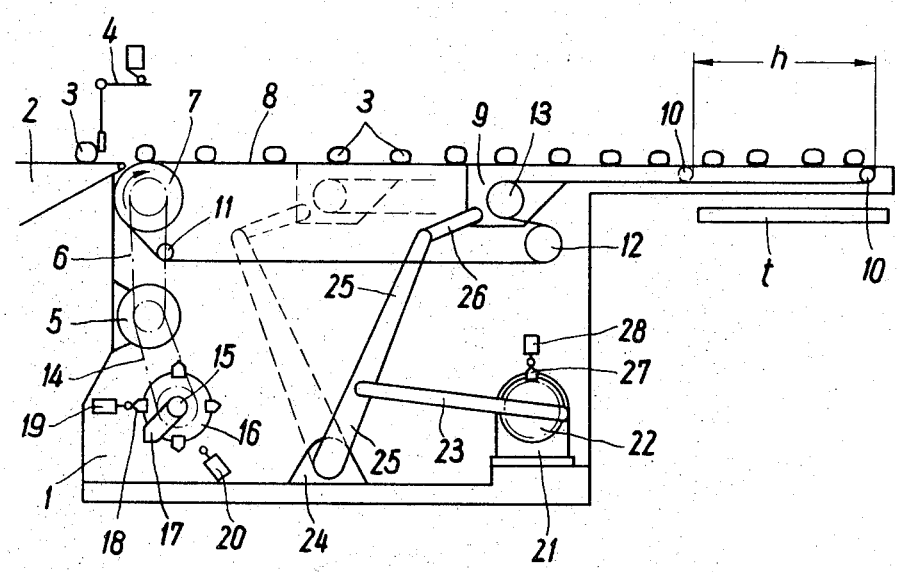
Inventors:
Walter Schnee
Peter Maag
By: Spencer & Kaye
Attorneys

APPARATUS FOR DEPOSITING ARTICLES IN ROWS

BACKGROUND OF THE INVENTION

The present invention relates to a machine for depositing dough balls to be baked or kneaded, which are received from a feed conveyor belt, onto a further transporting member such as an additional conveyor belt moved transverse to the direction of the feed conveyor belt or a removable receiving tray such as a baking sheet, fermentation rack or the like.

Dough depositing machines are already known which receive incoming pieces of dough or "dough balls" on an endless depositing belt that is provided with a weight loaded loop and passed around a movable depositing carriage. The depositing carriage is shifted stepwise by electric motor in the transport direction of the feed conveyor belt, then moved in a direction opposite to the direction of motion of the feed conveyor belt after a selected number of steps.

In addition to surrounding the depositing carriage the depositing belt is guided around a feed entry roller, one or more guide rollers and a rotatable weight-loading roller which forms the weight loaded loop. The feed entry roller is provided with a one-way clutch mechanism to prevent it from turning backward.

As the depositing carriage is moved in steps in the transport direction of the feed conveyor belt, the upper strand of the depositing belt, which carries and transports the successively received dough balls, is guided out over the member on which the dough balls are to be further transported. This is accomplished by raising the weight loaded belt loop and using the length of belt so obtained to extend the belt over the transporting member.

After a prescribed number of step movements, which number corresponds to the number of dough balls to be simultaneously placed in a row on the transporting member, the depositing carriage is returned to its initial position so that the lower portion of the depositing belt, and the upper strand thereof which is covered with dough balls, is drawn back by the action of the weight-loading roller and the dough balls are released to fall onto the transporting member immediately below.

The motion of the depositing carriage and, thus, the depositing belt is effected by a single electric motor. The motor is connected to drive a cam shaft having a suitable cam disc. As the cam disc turns it moves an arm that rests against it and, in addition, is flexibly coupled with the depositing carriage so that the carriage will be pushed forward, and then allowed to move backward, under control of the electric motor.

The electric motor is also connected to drive a cam having an indexing disc. As the indexing disc turns it actuates a switch, at prescribed regular intervals, which switches the the electric motor off. The motor is switched on by the presence of a dough ball supplied to the depositing belt. This can be accomplished, for example, by sensing the presence of the incoming dough balls with a suitable pulse switch. Thus, as each dough ball is received by the depositing belt the electric motor is turned on, drives the depositing carriage the distance of one step, and is automatically turned off.

The depositing belt of this prior art machine is, therefore, driven in a positive or form-locked manner by the weight-loading roller on one hand and the depositing carriage (by means of the cam disc controlled arm) on the other. As a result of the high inertia of this system, however, these parts cannot be driven fast enough to match the high through-puts found in modern automatic bakery installations. If an attempt is made to increase the speed of a known dough ball depositing machine of this type, the machine will operate in a vibrating or jolting fashion.

In order that a depositing machine of the type described above may operate quietly, safely and smoothly also at increased speeds, it has been proposed that an electric motor operated positive drive be provided for the depositing belt as well as the depositing carriage.

In this case, the cam shaft which is driven by the electric motor of the depositing machine carries a slot-cam disc in addition to the cam disc which actuates the pulse switch to turn off the motor in sympathy with the supply of dough balls. The slot-cam disc is designed to control the movements of the swing arm that is flexibly coupled with the depositing carriage. This is accomplished by a roller attached to one end of the swing arm and inserted in the curved slot of the slot-cam disc.

To avoid the use of the weight-loading roller to form the loop in the depositing belt in the depositing machines of the prior art, it has also been proposed to guide the belt around an additional stationary but rotatably mounted guide roller as well as an additional roller rotatably mounted on the depositing carriage.

Although the depositing machine just described operates considerably more smoothly than the machines known in the prior art, there still are limits as to the possible increase in its operating speed and through-put.

SUMMARY OF THE INVENTION

An object of the present invention, therefore, is to provide a machine for depositing articles in rows on a transport tray, conveyor belt or the like which operates smoothly even at elevated speeds.

This object, as well as other objects which will become apparent in the discussion that follows, is achieved, according to the present invention, by providing a separate drive motor for the forward movements of the depositing belt and the back and forth movements of the depositing carriage.

Thus, according to the preferred embodiment of the present invention, the depositing machine includes a depositing conveyor belt guided by a number of members which include a stationary roller defining one end of the transport length of the belt and a movable bar defining the other. The guide bar (which forms a part of the depositing carriage) is movable in a linear direction above the transporting member (e.g., the tray) to vary the transport length of the belt. A first electric motor is then provided to advance the belt one step from the stationary roller to the movable bar upon receipt of each dough ball. And, finally, a second electric motor is connected to move the movable bar in the linear direction in synchronism with the movement of the first electric motor. In particular, after a prescribed number of dough balls have been received at the end of the conveyor belt defined by the stationary roller, the second electric motor moves the bar in the direction opposite to the direction of movement of the conveyor belt and back again in one quick, positive action.

This construction of the depositing machine makes possible a considerable increase in the machine's operating speed and in its through-put. Also, as a result of the considerable increase in speed which the movable bar and its associated depositing carriage can be moved from one end of its path of travel to the other, the dough balls will be deposited on the transporting member with greater accuracy. This is important since each dough ball must flip over when deposited so that the kneading joint thereof will lie on the bottom.

BRIEF DESCRIPTION OF THE DRAWING

The single FIG. of the drawing is a schematic diagram of a preferred embodiment of the apparatus, according to the present invention, for depositing dough balls on a transporting member.

DESCRIPTION OF THE PREFERRED EMBODIMENTS

Referring now to the drawing, the single FIG. shows a preferred embodiment of the depositing machine, according to the present invention, arranged in a frame 1 between a feeding device 2 and a transporting member $t$ which serves to receive the balls of dough. The preceding feeding device 2, which may, for example, form a part of a dough cutting machine, a fermentation locker or the like, supplies the pieces of dough 3 with the aid of an endless belt. The transporting member *t* can, for example, be a tray or an additional conveyor belt arranged to move in a direction transverse to the direction of motion of the conveyor belt of the feeding device 2.

As the dough balls 3 leave the conveyor belt of the feeding device 2 they mechanically actuate a pulse switch device 4 that is operative to switch on an electric motor 5. The motor 5 is connected by means of a nonslip drive 6 with a drive roller 7 to move a conveyor belt 8 in the clockwise direction. The drive roller 7 is rotatably mounted to the frame 1 in such a way that it is permitted only to revolve in the clockwise direction.

The conveyor belt 8 surrounds a depositing carriage 9 including a bar 10 located at the right end of the carriage. The carriage is constructed to slide back and forth in the frame 1 in a direction parallel to the top of the conveyor belt 8.

The conveyor belt 8, which forms the depositing belt in this machine, is also passed around a roller 13 rotatably mounted on the depositing carriage 9, a stationary, but rotatably mounted guide roller 12 and a small stationary guide roller 11 rotatably mounted immediately ahead of the drive roller 7.

The electric motor 5 is also connected to rotate cam shaft 15 with the aid of an additional nonslip drive 14. The cam shaft 15 carries a cam plate 16 as well as a control arm 17. The cam plate 16 is provided with a plurality of cams 18 equal in number to the number of dough balls to be dropped in a row on the transporting member *t*. The cams 18 successively actuate a switch 19 that is operative to switch off the electric motor 5 a short time after it has been switched on by the pulse switch 4. The motor 5 will therefore be operative to move the top of the conveyor belt 8 a short distance toward the right every time it receives a dough ball 3. As a result, the dough balls 3 will be spaced at regular intervals on the belt 8, as shown in the FIG., and transported toward the region above the transporting member designated with the letter "h".

The control arm 17 is arranged to actuate a switch 20 which turns on an additional electric motor 21. The motor 21 serves to move the depositing carriage 9 back and forth.

The drive roller 7, the cam plate 16 and the control arm 17 are so arranged and dimensioned that the cam plate 16 and the control arm 17 will make one complete revolution every time the top of the conveyor belt 8 is moved the distance *h*. The distance *h* is defined by the stroke length of the depositing carriage 9; that is, *h* is the distance between the bar 10 when the carriage is moved to its furthermost left position (shown in dashed lines) and the bar 10 when the carriage is moved to its furthermost right, or normal position.

The distance between successive ones of the dough balls 3 is determined by the arrangement of the cams 18 on the cam plate 16. Either the cams 18 are removable and may be placed at any selected position around the edge of the cam plate 16, or the cam plate 16 is removable and may be replaced by another similar cam plate having a different number and arrangement of cams. Therefore, if it is desired to increase or decrease the distance between successive dough balls, the cam plate may be provided with a smaller or greater number of cams, respectively.

The second electric motor 21 drives a disc crank 22. Connected to this disc crank is a drive member 23 which, in turn, is flexibly coupled with an arm 25 that swivels about a stationary pivot 24. The upper end of the arm 25 is flexibly coupled, with the aid of an intermediate arm 26, with the left-hand end of the depositing carriage 9. The disc crank 22, the drive member 23 and the swivel arm 25 are dimensioned so that the depositing carriage 9 will move the distance *h* toward the left and back again with one revolution of the electric motor 21.

As mentioned above, the electric motor 21 is switched on when the control arm 17 actuates the switch 20. After one complete revolution, the motor is switched off; this may be accomplished, for example, by providing the disc crank 22 with a cam 27 which actuates a switch 28 after each revolution.

The electric motor 5 moves the upper portion of the conveyor belt 8 in steps from left to right. As mentioned above, each movement is initiated by the actuation, by a dough ball 3, of the pulse switch 4. Each time one of the dough balls reaches the rightmost end of the upper portion of the conveyor belt 8, the electric motor 21 is turned on by the switch 20 and moves the depositing carriage toward the left, and back again to its initial position at the right, in one swift motion. Because the drive roller 7 is prevented from rotating in the counterclockwise direction, the upper strand or portion of the conveyor belt 8 is prevented from moving backwards. As a result, the upper portion of the conveyor belt 8 which is located in the region designated with the letter *h* will be drawn downward around the bar 10 and to the left by the roller 13, rotatably mounted on the depositing carriage 9, causing the dough balls in the region *h* to drop upside down on the transporting member *t*.

It will be understood that the above description of the present invention is susceptible to various modifications, changes and adaptations.

I claim:

1. Apparatus for depositing articles in rows on a receiving member comprising, in combination:

a. a conveyor belt;

b. a plurality of guide means for guiding said conveyor belt, said guide means including a first stationary guide means defining one end of the transport length of said belt and a first movable guide means defining the other end of the transport length of the belt, said movable guide means being movable in a linear direction over the receiving member, thereby to impart to said conveyor belt a variable transport length;

c. first means, including a first electric motor, for intermittently advancing said conveyor belt from said first stationary guide means to said first movable guide means when each article is received by said belt at said one end; and d. second means, including a second electric motor, for moving said first movable guide means in said linear direction in synchronism with the movement of said first means, said second means, after a prescribed number of articles have been received at said one end, moving said first movable guide means in the direction opposite to the direction of movement of said conveyor belt and back again.

2. The apparatus defined in claim 1 wherein said conveyor belt is an endless belt and surrounds said first stationary and said first movable guide means, and wherein said first stationary guide means includes a roller.

3. The apparatus defined in claim 1 wherein said second means includes a sliding carriage, said first movable guide means being mounted on said sliding carriage.

4. The apparatus defined in claim 3 wherein said first stationary guide means includes a first stationary roller and means for preventing said first stationary roller from rotating in the direction opposite to the transport direction of said conveyor belt, and wherein said plurality of guide means further includes a second and third stationary roller and a second movable guide means mounted on said sliding carriage, said second movable guide means being a roller, thereby to maintain tension in said conveyor belt when said first and second movable guide means are moved.

5. The apparatus defined in claim 1 wherein said first means includes means connecting said first electric motor to rotate said roller forming said first stationary guide means; means for sensing the receipt of each article by said belt at said one end and switching on said first electric motor in response thereto; and means for switching off said first electric motor after said first electric motor has moved said belt a prescribed distance.

6. The apparatus defined in claim 5 wherein said means for switching off said first electric motor includes a rotatable control shaft means mechanically coupled to be rotated by said first electric motor, and means for switching off said first electric motor upon rotation of said control shaft means a prescribed first angular distance.

7. The apparatus defined in claim 6, wherein said means for switching off said first electric motor includes means for switching on said second electric motor upon rotation of said control shaft means a prescribed second angular distance.

8. The apparatus defined in claim 7, wherein said second angular distance of said means for switching on said second electric motor is a multiple of said first angular distance of said means for switching off said first electric motor, said multiple being the number of articles which are deposited on the receiving member when said first movable guide means are moved in the direction opposite to the direction of movement of said belt and back again.

9. The apparatus defined in claim 6, wherein said first angular distance of said means for switching off said first electric motor is adjustable.

10. The apparatus defined in claim 7 wherein said second angular distance of said means for switching on said second electric motor is adjustable.

11. The apparatus defined in claim 3, wherein said second means further includes an electric motor; crank means, mechanically coupled to be rotated by said electric motor; and drive means, connecting said sliding carriage with said crank means, for moving said first movable guide means in the direction opposite to the direction of movement of said conveyor belt and back again during one revolution of said crank means.

12. The apparatus defined in claim 11 wherein said second means further includes means for switching off said electric motor after a complete revolution of said crank means.